(12) United States Patent
Kume

(10) Patent No.: US 12,535,414 B2
(45) Date of Patent: Jan. 27, 2026

(54) PLANT SENSOR DEVICE AND METHOD FOR ACTIVE OPTICAL SENSING OF PLANTS

(71) Applicant: KYUSHU UNIVERSITY, NATIONAL UNIVERSITY CORPORATION, Fukuoka (JP)

(72) Inventor: Atsushi Kume, Fukuoka (JP)

(73) Assignee: KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 18/867,866

(22) PCT Filed: May 22, 2023

(86) PCT No.: PCT/JP2023/018895
§ 371 (c)(1),
(2) Date: Nov. 21, 2024

(87) PCT Pub. No.: WO2023/228894
PCT Pub. Date: Nov. 30, 2023

(65) Prior Publication Data

US 2025/0362227 A1    Nov. 27, 2025

(30) Foreign Application Priority Data

May 24, 2022    (JP) ................. 2022-084539

(51) Int. Cl.
*G01N 21/359* (2014.01)
*A01C 21/00* (2006.01)
(Continued)

(52) U.S. Cl.
CPC ......... *G01N 21/359* (2013.01); *A01C 21/007* (2013.01); *A01G 9/26* (2013.01); *A01G 25/16* (2013.01); *G01N 33/0098* (2013.01)

(58) Field of Classification Search
CPC ........ A01C 21/007; A01G 9/26; A01G 25/16; G01N 21/359; G01N 33/0098
See application file for complete search history.

(56) References Cited

U.S. PATENT DOCUMENTS 4,272,679 A * 6/1981 Blades .................. G01J 1/58
                                                   250/461.1
2005/0072935 A1    4/2005 Lussier

FOREIGN PATENT DOCUMENTS

DE    102012215660 A1 *  3/2014  ............. G01N 21/53
JP    2011-133451 A       7/2011
(Continued)

OTHER PUBLICATIONS

International Preliminary Report on Patentability and Written Opinion of the International Searching Authority for International Application No. PCT/JP2023/018895, dated Nov. 7, 2024, with an English translation.
(Continued)

*Primary Examiner* — Monica L Perry
*Assistant Examiner* — Aaron M Rodziwicz
(74) *Attorney, Agent, or Firm* — Birch, Stewart, Kolasch & Birch, LLP

(57) ABSTRACT

A plant sensor device that suppresses the influence of external light from the surrounding environment and determine highly accurate parameters relating to the leaf biomass of a plant with a simple and low-cost configuration for quantifying the degree of plant growth, which is a plant sensor device 100, including: a light source 11 that intermittently irradiates a plant with near-infrared light (NIR); a radiation sensor 21 that is disposed on a side opposite to the light source 11 with respect to the plant, receives transmitted light of the near-infrared light that has passed through the plant, and outputs a photoelectrically converted output value; and a recording unit 31 that records the output value
(Continued)

from the radiation sensor 21, in which the recording unit 31 records an irradiation period and an extinction period of the near-infrared light in the light source 11, and the recording unit 31 classifies output values from the radiation sensor into the following: (1) NIR output values during the irradiation period of the near-infrared light; and (2) non-irradiated output values during the extinction period of the near-infrared light; and a method for active optical sensing of plants.

20 Claims, 8 Drawing Sheets

(51) Int. Cl.
*A01G 9/26* (2006.01)
*A01G 25/16* (2006.01)
*G01N 33/00* (2006.01)

(56) References Cited

FOREIGN PATENT DOCUMENTS

| JP | 5718153 B2 | 5/2015 | |
|---|---|---|---|
| JP | 2020-198804 A | 12/2020 | |
| WO | WO-2017067711 A1 * | 4/2017 | ............ G01J 5/0896 |

OTHER PUBLICATIONS

International Search Report for International Application No. PCT/JP2023/018895, dated Aug. 8, 2023, with English translation.

Mano et al., "Experimental Study for Estimation of Leaf Area Index (LAI) and Vigor Using Transmitted Spectral Properties," Journal of the Japanese Institute of Landscape Architecture, vol. 62, No. 5, 1999, pp. 543-546, with English summary.

* cited by examiner

[Fig. 1]
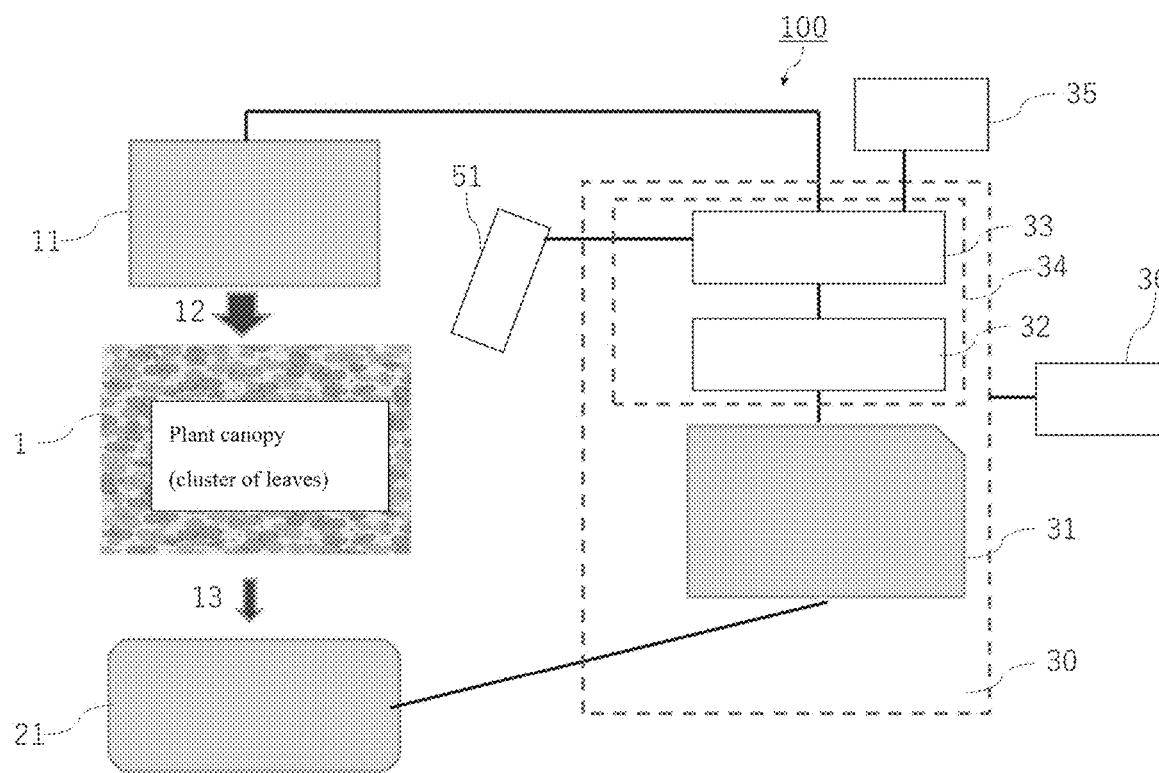

[Fig. 2]
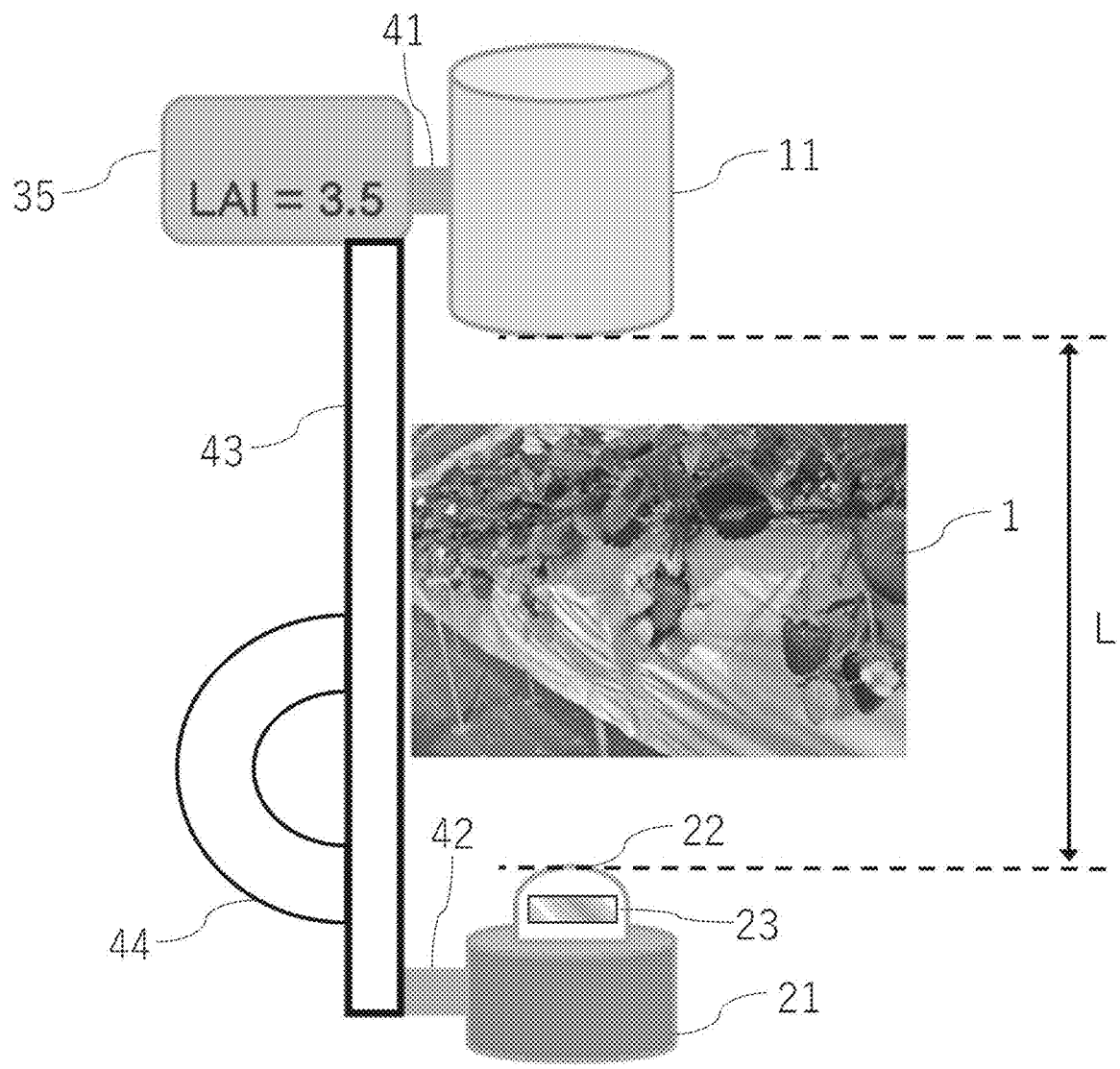

[Fig. 3]
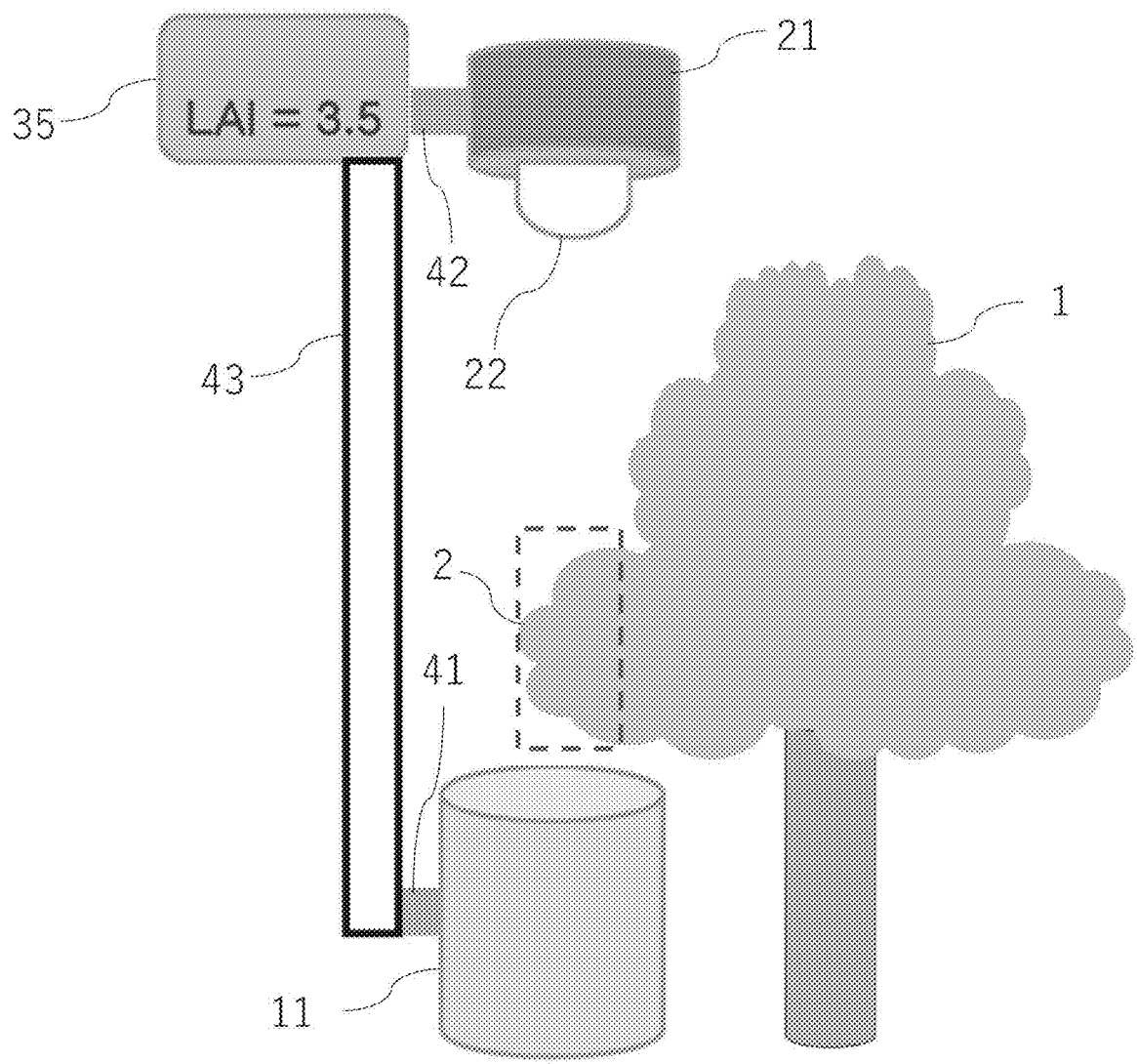

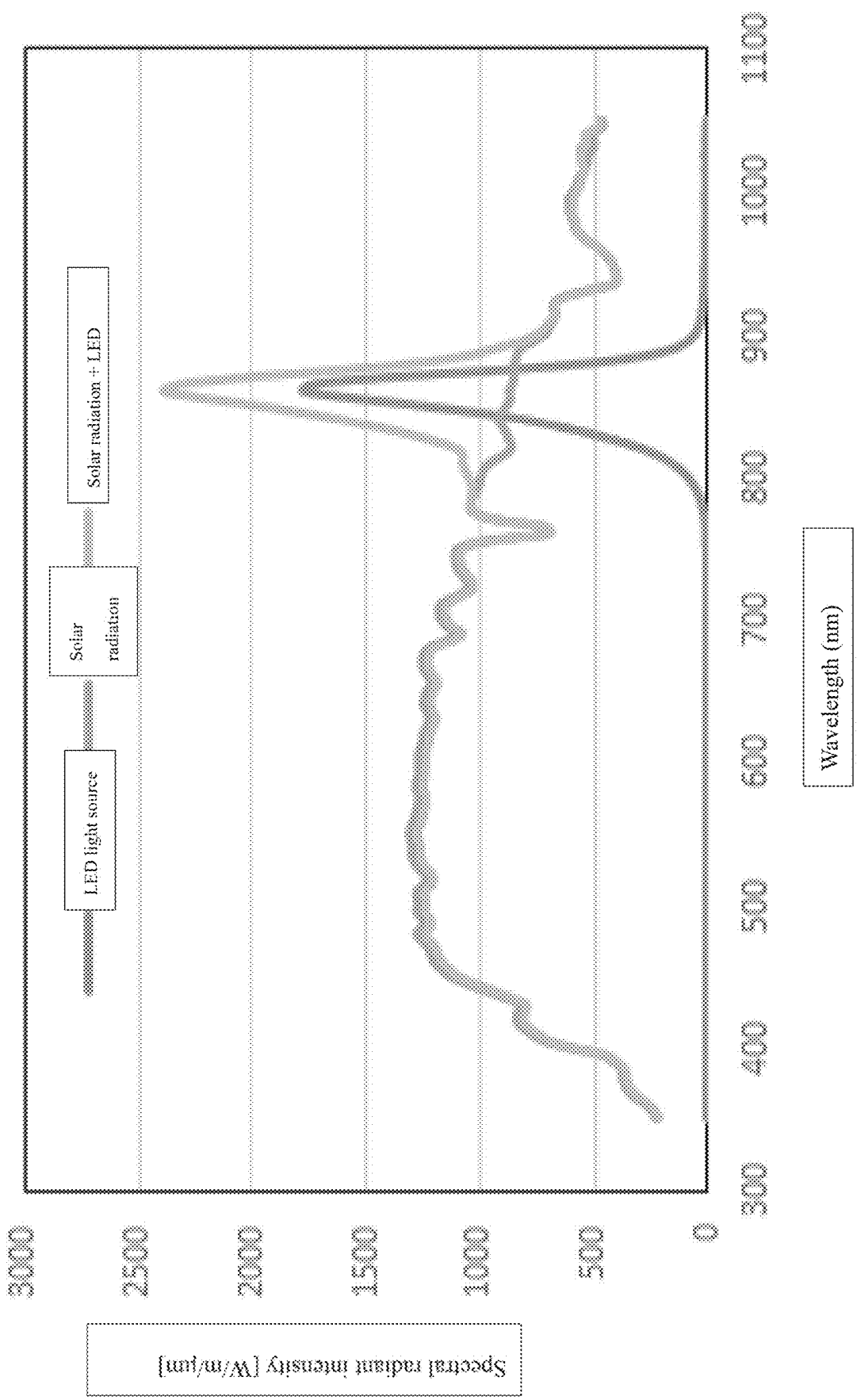
[Fig. 4]

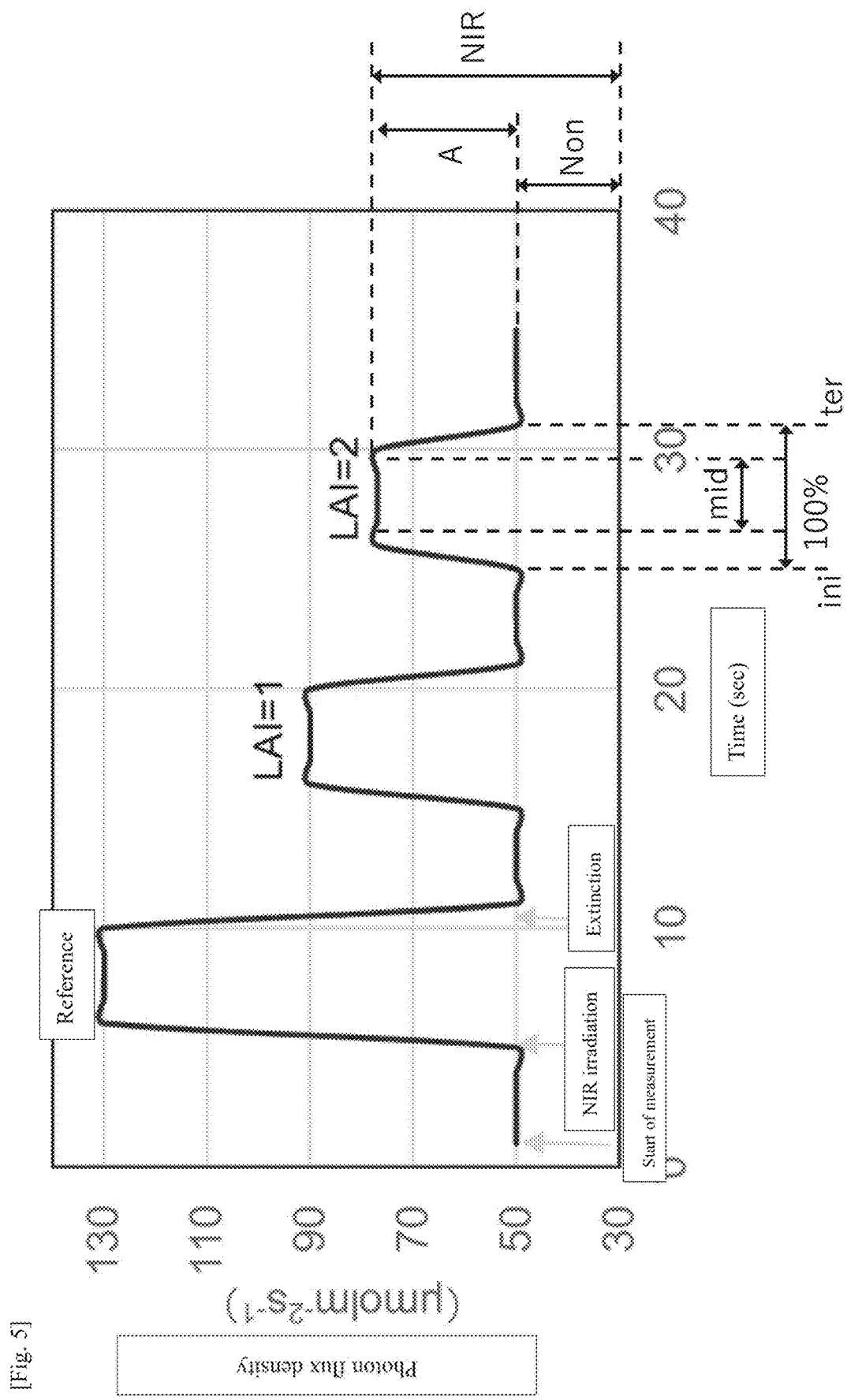
[Fig. 5]

[Fig. 6]
(A) 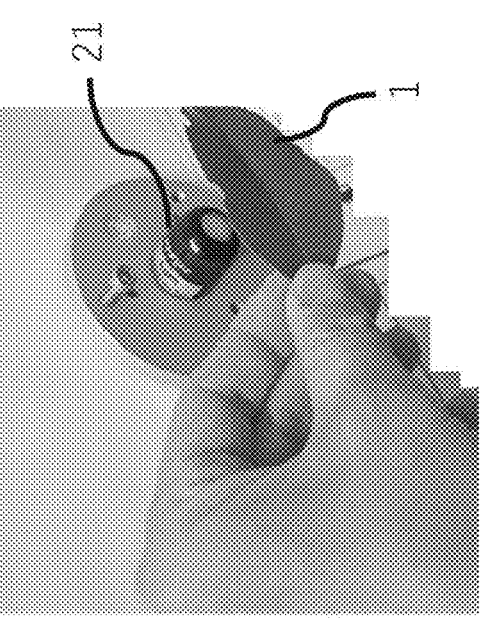
(B) 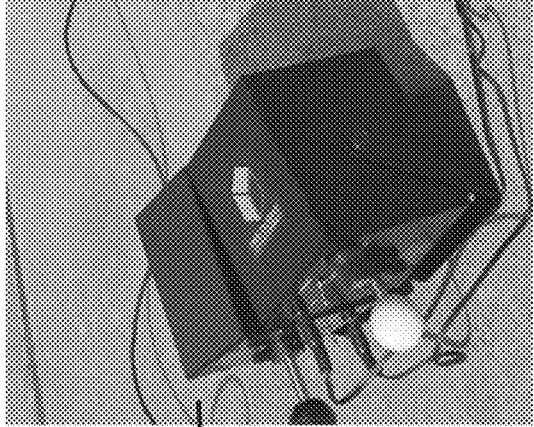
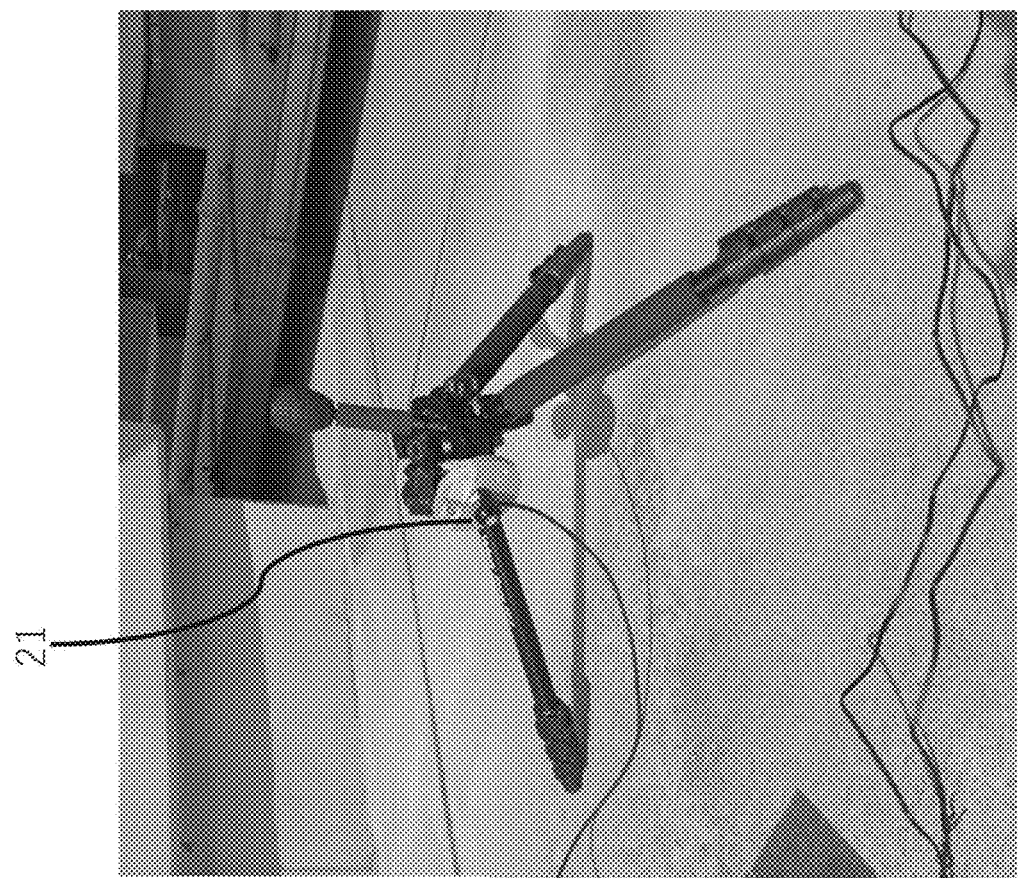

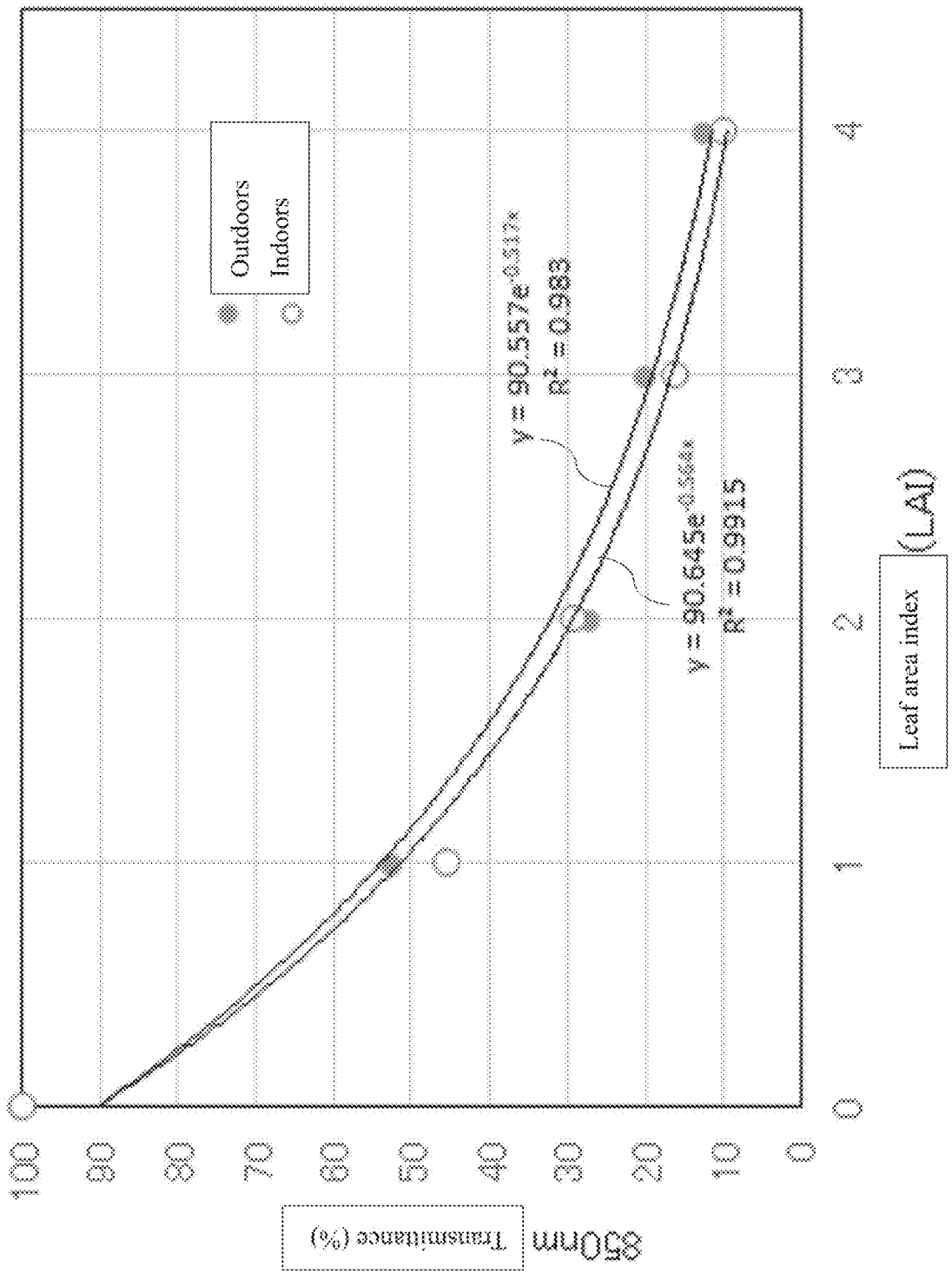
[Fig. 7]

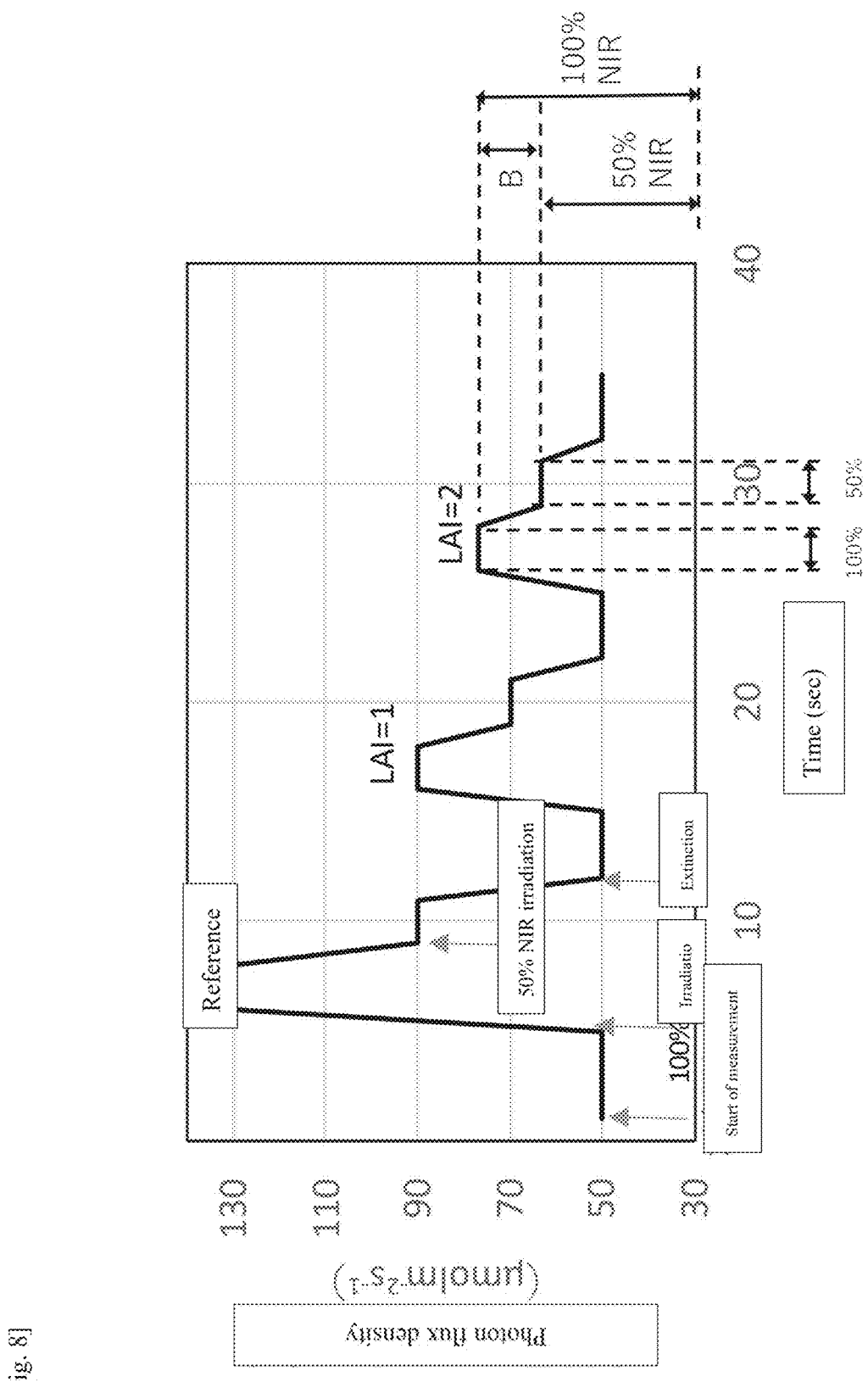
[Fig. 8]

PLANT SENSOR DEVICE AND METHOD FOR ACTIVE OPTICAL SENSING OF PLANTS

TECHNICAL FIELD

The present invention relates to a plant sensor device and a method for active optical sensing of a plant.

BACKGROUND ART

In recent years, with the development of data-related technology, there has been a need to quantify the degree of plant growth. The leaf area index (LAI) and the fraction of absorbed photosynthetically active radiation (fAPAR) are known as indicators of the degree of plant growth. For example, the leaf area index is an index value indicating the sum of the area of one side of all leaves of the upper canopy per unit horizontal area. For example, as long as the total area of leaves on 1 $m^2$ of ground is 2 $m^2$, it results in LAI=2, which means that when the leaves are arranged on the ground without gaps, two of them will overlap. The leaf area index of normal forest vegetation is about 3 to 7. The leaf area index is an important parameter for evaluating vegetation functions, and thus is widely used as an important indicator of absorption of photosynthetically active radiation, photosynthetic capacity, transpiration rate, and carbon absorption capacity of vegetation in the fields of agriculture, forest science, ecology, earth environmental science, and the like.

As a method for determining the leaf area index, Patent Document 1 describes an optical vegetation index sensor comprising: a first radiation sensor which receives transmitted radiation transmitted through a leaf or a cluster of leaves, corrects the spectral characteristics of radiation in a visible radiation region of 400 nm to 700 nm using a correction filter to measure the radiation in terms of the photon flux density, and outputs the corrected radiation as a PAR output indicating either photosynthetically active radiance intensity or photosynthetic photon flux density by photoelectric conversion in a light-receiving unit; a second radiation sensor that extracts only radiation in an infrared radiation region of 700 nm to 1000 nm from the received radiation using a bandpass filter, and outputs an IR output indicating either the unit of radiant intensity or the unit of photon flux density common to the PAR output by photoelectrically converting this radiation in the light-receiving unit; and a computing unit that integrates the PAR output and the IR output over time, divides the integrated value of the IR output by the integrated value of the PAR output to calculate a ratio, and obtains the leaf area index corresponding to the ratio.

The optical vegetation index sensor of Patent Document 1 is based on the applied use of a known correlation of log Y=0.3813+0.0989X between a spectral intensity ratio Y (=800/675) of red radiation (wavelength: 675 nm) and near-infrared radiation (wavelength: 800 nm) that have passed through the vegetation and a leaf area index X, which can be referred to as a "transmission NIR/PAR method."

Patent Document 1 also describes, as other methods for determining the leaf area index, a "fisheye lens method" in which a fisheye lens and an electronic image sensor are used to capture images of a predetermined area for each of near-infrared radiation and red radiation and the brightness value ratio is obtained to estimate the relative amount of solar radiation, a "Plant Canopy Analyzer" (such as LAI-2000) developed by LI-COR, USA, which optically divides the entire sky into five ring-like sections to measure the intensity distribution of blue radiation in the entire sky, and the like.

Meanwhile, methods for optically determining not only the leaf area index but also other growth conditions are known, and these can be divided into a method using transmitted light similar to that of Patent Document 1, a method using scattered light (Patent Document 2), and a method using reflected light (Patent Document 3).

Patent Document 2 describes a transmitted light sensor unit for a plant community which comprises a visible light sensor that detects visible light and a near-infrared light sensor that detects near-infrared light and is used to determine the growth state of a plant, the device including a transparent pipe and a pair of black cover plates that close both ends of the pipe, in which with the pipe standing vertically, a visible light sensor and a near-infrared light sensor are attached to the inner center of the pipe on the underside of the upper cover plate, with their light receiving surfaces facing downward.

Patent Document 3 describes a plant sensor device comprising: a first light-emitting unit that emits a first measurement light having a first wavelength to irradiate a growth status measurement target; a second light-emitting unit that emits a second measurement light having a second wavelength to irradiate the growth status measurement target; a light-receiving unit that receives reflected light of each measurement light from the growth status measurement target and outputs a light-receiving signal; a control unit that controls emission from the first light-emitting unit and emission from the second-light emitting unit at different timings; an optical path joining means for joining a first outgoing optical path of first measurement light from the first light-emitting unit and a second outgoing optical path of second measurement light from the second light-emitting unit; and an emission section for emitting the first measurement light and the second measurement light toward the growth status measurement target, wherein an outgoing part has an optical member having a refractive power in only one direction when viewed in a plane perpendicular to the outgoing optical axis, and the optical member is held so as to be rotatable around the outgoing optical axis.

PRIOR ART DOCUMENTS

Patent Documents

Patent Document 1: JP Patent Publication No. 2011-133451 A
Patent Document 2: JP Patent Publication No. 2020-198804 A
Patent Document 3: Japanese Patent No. 5718153

SUMMARY OF INVENTION

Objects to be Solved by the Invention

However, since the optical vegetation index sensor described in Patent Document 1 includes a total of two expensive radiation sensors comprising filters, there is a demand for further cost reduction. The accuracy of the transmitted NIR/PAR method depends on the spectral stability of the incident sunlight (solar radiation), but there was a problem in that the NIR/PAR of the incident solar radiation could fluctuate by 10% or more depending on the sky conditions. In addition, with light sources other than sunlight, the NIR/PAR of the incident light varies greatly and is affected by the surrounding environment inside a greenhouse, making it difficult to use, especially in an artificial light environment.

As for the other method described in Patent Document 1, the fisheye lens method has a problem in that images taken on sunny days cannot be used. LI-COR's Plant Canopy Analyzer requires simultaneous measurements both inside and outside the forest on cloudy days; thus, there was a problem that it could not be used in environments with large fluctuations in solar radiation or in artificial light environments.

The device described in Patent Document 2 also comprises a total of two expensive visible light sensors and near-infrared light sensors. In addition, to detect scattered light, black cover plates were required above and below the device, and in the case of a horizontally placed type, a second cover plate was also required, making the device configuration complex. Furthermore, Patent Document 2 describes canceling data on cloudy and rainy days to remove the influence of fluctuations in solar radiation, but this poses the problem of being affected by external light from the surrounding environment. Therefore, there is a demand for further cost reduction and higher accuracy.

In a device that detects reflected light using an irradiation sensor (light-receiving unit) as described in Patent Document 3, in order to remove the influence of ambient light through calculation, two types of measurement light with different wavelengths are detected by a light-receiving unit formed of two to six photodiodes. In addition, to detect reflected light from two types of measurement light, the light source (outgoing part) required an optical element (lens) with a refractive index that was held rotatably around the optical axis, making the device configuration complex. Therefore, there is a demand for further cost reduction.

An object of the present invention is to provide a plant sensor device that can suppress the influence of external light from the surrounding environment and determine highly accurate parameters relating to the leaf biomass of a plant with a simple and low-cost configuration for quantifying the degree of plant growth.

Means for Solving the Objects

According to the present invention, the above problems have been solved by: (1) actively and intermittently irradiating near-infrared light from a light source, and classifying and recording the output values from a radiation sensor during an irradiation period and an extinction period of near-infrared light; or (2) actively irradiating near-infrared light from a light source at two or more levels of intensity, and classifying and recording output values from a radiation sensor during an irradiation period of a first emission intensity of near-infrared light and an irradiation period of a second emission intensity of near-infrared light.

The configuration of the present invention, which is a specific means for solving the above problems, and a preferred configuration of the present invention will be described below.

[1] A plant sensor device, comprising: a light source that intermittently irradiates a plant with near-infrared light (NIR);
a radiation sensor that is disposed on a side opposite to the light source with respect to the plant, receives transmitted light of the near-infrared light that has passed through the plant, and outputs a photoelectrically converted output value; and
a recording unit that records the output value from the radiation sensor,
wherein the recording unit records an irradiation period and an extinction period of the near-infrared light in the light source, and
wherein the recording unit classifies output values from the radiation sensor into the following: (1) NIR output values during the irradiation period of the near-infrared light; and (2) non-irradiated output values during the extinction period of the near-infrared light.

[2] The plant sensor device according to [1], which comprises a computing unit that calculates a difference A calculated from (NIR output value)−(non-irradiated output value) and further converts the difference A into a leaf area index.

[3] The plant sensor device according to [2], wherein the leaf area index is a linear function of a logarithmic function with the difference A or its function being an antilogarithm.

[4] The plant sensor device according to [2] or [3], which comprises a growing means for controlling at least one of a fertilizer, a moisture, a temperature and a humidity, such that growth of plant leaves is suppressed when the leaf area index is above a predetermined range, or growth of plant leaves is promoted when the leaf area index is below a predetermined range.

[5] The plant sensor device according to any one of [1] to [4], wherein the plant refers to a cluster of leaves or a plant canopy.

[6] The plant sensor device according to any one of [1] to [5], wherein the light source consists of a near-infrared light source.

[7] The plant sensor device according to [6], wherein the near-infrared light source irradiates narrow-band near-infrared light having a peak wavelength of 750 nm to 1100 nm and a half width of 50 nm or less.

[8] The plant sensor device according to any one of [1] to [7], wherein the radiation sensor comprises a bandpass filter that filters light having a wavelength band of less than 750 nm so as to extract radiation of only near-infrared light having a wavelength band of 750 nm or more.

[9] The plant sensor device according to any one of [1] to [8], which comprises a radiation sensor-fixing part that fixes the radiation sensor,
wherein the radiation sensor-fixing part fixes the radiation sensor below a measuring section of the plant in such a manner that the light-receiving surface faces the measuring section.

[10] The plant sensor device according to any one of [1] to [9], which comprises a light source-fixing part that fixes the light source,
wherein the light source-fixing part fixes the light source above a measuring section of the plant.

[11] The plant sensor device according to any one of [1] to [10], which comprises: a radiation sensor-fixing part that fixes the radiation sensor; a light source-fixing part that fixes the light source; and a connecting member that connects the radiation sensor-fixing part and the light source-fixing part,
wherein a distance between the light source and a light-receiving surface of the radiation sensor is 1 to 1000 cm.

[12] The plant sensor device according to [11], wherein the connecting member comprises a gripping part.

[13] The plant sensor device according to any one of [1] to [12], which comprises: a radiation sensor-fixing part that fixes the radiation sensor; and a light source-fixing part that fixes the light source, wherein the light source-fixing part fixes the light source below a measuring section of the plant, and wherein the radiation sensor-fixing part fixes the radiation sensor above the measuring section of the plant in such a manner that the light-receiving surface faces the measuring section.

[14] The plant sensor device according to any one of [1] to [13], wherein the output values in the middle period of 25% to 75% of the irradiation period and the extinction period are used as the NIR output value and the non-irradiation output value, when the irradiation period and the extinction period are set as 100% from the initial to the terminal of the irradiation period and the quenching period, respectively.

[15] The plant sensor device according to any one of [1] to [14], wherein the irradiation period and the extinction period are both between 1 millisecond and 1 minute.

[16] The plant sensor device according to any one of [1] to [15], which further comprises a control unit, wherein the control unit controls the irradiation period and the extinction period of the light source to be approximately equal to each other within ±30%.

[17] A plant sensor device, comprising: a light source that irradiates a plant with near-infrared light (NIR);

a radiation sensor that is disposed on a side opposite to the light source with respect to the plant, receives transmitted light of the near-infrared light that has passed through the plant, and outputs a photoelectrically converted output value;

a recording unit that records the output value from the radiation sensor; and a control unit, wherein the control unit controls the light source such that the light source irradiates infrared light at a first emission intensity and a second emission intensity that is 1/n (n is a positive integer) the first emission intensity, and wherein the recording unit classifies (1) NIR output values during the irradiation period of near-infrared light, included in output values from the radiation sensor, into the following: (1-1) first NIR output values during the irradiation period of the near-infrared light at the first emission intensity; and (1-2) second NIR output values during the irradiation period of the near-infrared light at the second emission intensity,

[18] The plant sensor device according to [17], which comprises a computing unit that calculates a difference B calculated from (first NIR output value)–(second NIR output value) and convert the difference B into a leaf area index.

[19] A method for active optical measurement of a plant using the plant sensor device according to any one of [1] to [18].

[20] The method for active optical measurement of a plant according to [19], which is used for ground truth for remote sensing from an air or space, plant growth measurement in a plant growth facility, forest vegetation measurement, and leaf biomass measurement for a plant community or cluster of leaves.

Advantageous Effects of Invention

According to the present invention, a plant sensor device that can suppress the influence of external light from the surrounding environment and determine highly accurate parameters relating to the leaf biomass of a plant with a simple and low-cost configuration for quantifying the degree of plant growth can be provided.

BRIEF DESCRIPTION OF DRAWINGS

FIG. 1 is a schematic diagram showing a cross-section of an example of the plant sensor device of the present invention.

FIG. 2 is a schematic diagram showing a cross-section of another example of the plant sensor device of the present invention.

FIG. 3 is a schematic diagram showing a cross-section of another example of the plant sensor device of the present invention.

FIG. 4 shows the spectra of solar radiation and an LED light source (peak wavelength: 850 nm).

FIG. 5 is a graph showing the relationship between the time from the start of measurement and the photon flux density (output value) in Example 1.

FIG. 6(A) is a photograph of a leaf of the plant that was a measurement target in Example 2, and the radiation sensor used. FIG. 6(B) is a photograph of the configuration of the plant sensor device of Example 2.

FIG. 7 is a graph showing the relationship between leaf area index and 850-nm transmittance in indoor and outdoor measurements.

FIG. 8 is a graph showing the relationship between the time from the start of measurement and the photon flux density (output value) in Example 3.

EMBODIMENT OF CARRYING OUT THE INVENTION

The present invention will be described in detail below. The following description of the components may be based on representative embodiments or specific examples, but the present invention is not limited to such embodiments. A numerical range expressed herein using "to" means a range that includes the numerical values before and after "to" as the lower and upper limits.

[Plant Sensor Device]

A first aspect of the plant sensor device of the present invention comprises: a light source that intermittently irradiates a plant with near-infrared light (NIR);

a radiation sensor that is disposed on a side opposite to the light source with respect to the plant, receives transmitted light of the near-infrared light that has passed through the plant, and outputs a photoelectrically converted output value; and a recording unit that records the output value from the radiation sensor, wherein the recording unit records an irradiation period and an extinction period of the near-infrared light in the light source, and the recording unit classifies output values from the radiation sensor into the following: (1) NIR output values during the irradiation period of the near-infrared light; and (2) non-irradiated output values during the extinction period of the near-infrared light.

A second aspect of the plant sensor device of the present invention comprises: a light source that irradiates a plant with near-infrared light (NIR);

a radiation sensor that is disposed on a side opposite to the light source with respect to the plant, receives transmitted light of the near-infrared light that has passed through the plant, and outputs a photoelectrically converted output value; and a recording unit that records the output value from the radiation sensor; and a control unit, wherein the control unit controls the light source such that the light source irradiates infrared light at a first emission intensity and a second emission intensity that is 1/n (n is a positive integer) the first emission intensity, and wherein the recording unit classifies (1) NIR output values during the irradiation period of near-infrared light, included in output values from the radiation sensor, into the following: (1-1) first NIR output values during the irradiation period of the near-infrared light at the first emission intensity; and (1-2) second NIR output values during the irradiation period of the near-infrared light at the second emission intensity.

These configurations can suppress the influence of external light from the surrounding environment and determine highly accurate parameters relating to the leaf biomass of a plant with a simple and low-cost configuration for quantifying the degree of plant growth.

Herein, the "leaf mass" of a plant includes not only the degrees of growth such as LAI, degree of luxuriance, and biomass of the aerial part but also physiological functions such as leaf chlorophyll content, photosynthetic activity, senescence, and stress response.

Hereinafter, preferred embodiments of the present invention will now be described. Hereinafter, an aspect preferable as the first aspect of the plant sensor device of the present invention will be mainly described. However, such an aspect preferable as the first aspect of the plant sensor device of the present invention can be an aspect preferable as the second aspect of the present invention. Meanwhile, the aspect preferable as the second aspect of the plant sensor device of the present invention can be the aspect preferable as the first aspect of the present invention.

[Outline of Plant Sensor Device]

First, an outline of the plant sensor device of the present invention will be described with reference to the drawings. Note that the present invention should not be construed as being limited by the drawings.

FIG. 1 is a schematic diagram showing a cross-section of an example of the plant sensor device of the present invention. The plant sensor device 100 illustrated in FIG. 1 comprises: a light source 11 that intermittently irradiates a plant 1 (a plant community, specifically a cluster of leaves) with near-infrared light 12; a radiation sensor 21 that is disposed on a side opposite to the light source 11 with respect to the plant, receives transmitted light of the near-infrared light that has passed through the plant, and outputs a photoelectrically converted output value; and a recording unit 31 that records the output value from the radiation sensor 21, In the plant sensor device illustrated in FIG. 1, the recording unit 31 records an irradiation period and an extinction period of the near-infrared light in the light source 11, and the recording unit 31 classifies output values from the radiation sensor into the following: (1) NIR output values during the irradiation period of the near-infrared light; and (2) non-irradiated output values during the extinction period of the near-infrared light.

The plant sensor device illustrated in FIG. 1 comprises a computing unit 32 and a control unit 33, which may be optionally included, in addition to the recording unit 31 in the computer 30. The computing unit 32 and the control unit 33 may be part of CPU 34.

In addition, a display unit 35 that may be optionally included is connected to the computer 30 such that any calculation results can be displayed. Further, the computer 30 may be connected to an external output unit 36, which can output data to another PC, a printer, or the like.

The computer 30 may comprise an input means (not shown). Any program or the like may be stored in the recording unit 31 (memory or the like) from the input means. For example, a program for the computing unit to calculate the degree of growth of the plant, a program for the control unit to control the growing means, or the like may be stored in advance in the recording unit 31. A program on an external memory, network, or cloud may be operated by the computer 30 via the input means or output unit 36 and controlled by the control unit.

The plant device illustrated in FIG. 1 comprises a growing means 51 that may be optionally included. The growing means 51 can control at least one of a fertilizer, a moisture, a temperature, or a humidity for the plant 1 such that in a case in which the leaf area index is above a predetermined range, the growth of leaves of the plant 1 is suppressed or in a case in which the leaf area index is below a predetermined range, the growth of leaves of the plant is promoted.

FIG. 2 is a schematic diagram showing a cross-section of another example of the plant sensor device of the present invention. In FIG. 2, a cluster of strawberry leaves is a target as the plant 1.

The plant sensor device illustrated in FIG. 2 comprises a light source-fixing part 41 that fixes the light source 11. The light source-fixing part 41 fixes the light source 11 above a measuring section of the plant 1.

In the plant sensor device illustrated in FIG. 2, the radiation sensor 21 comprises a bandpass filter 23 and is fixed to a radiation sensor-fixing part 42. The radiation sensor-fixing part 42 fixes the radiation sensor 21 below the measuring section of the plant in such a manner that the light-receiving surface 22 faces the measuring section.

The plant sensor device illustrated in FIG. 2 comprises a connecting member 43 that connects the radiation sensor-fixing part 42 and the light source-fixing part 41 such that a distance L from the light source 11 to the light-receiving surface 22 of the radiation sensor 21 can be optionally adjusted. In addition, the distance L from the light source 11 and the light-receiving surface 22 of the radiation sensor 21 may be constant. For example, in a case in which a cluster of strawberry leaves is a target, the distance L can be about 50 cm.

The plant sensor device illustrated in FIG. 2 comprises a gripping part 44 attached to the connecting member 43 such that the gripping part 44 is used as a handheld plant sensor device that a human can grip.

The plant sensor device illustrated in FIG. 2 comprises the display unit 35 connected as part of the integrated structure such that the LAI value can be displayed externally.

Note that the recording unit and CPU (including the computing unit and the control unit) are omitted in the plant sensor device illustrated in FIG. 2.

FIG. 3 is a schematic diagram showing a cross-section of another example of the plant sensor device of the present invention. FIG. 3 shows an example of a large device in which a broad-leaved tree is used as the plant 1 to be measured, and a partial area of the leaves of the broad-leaved tree is used as the measuring section 2.

The plant sensor device illustrated in FIG. 3 has a structure in which the positional relationship between the light source 11 and the radiation sensor 21 is inverted upside down (light source 11 is at the bottom) compared to the plant sensor device illustrated in FIG. 2.

Note that the recording unit and CPU (including the computing unit and the control unit) are omitted in the plant sensor device illustrated in FIG. 3.

Hereinafter, a preferred aspect of the plant sensor device of the present invention will be described in detail.

<Plant>

There are no particular limitations on the plant as a measurement target in the present invention.

Trees, grasses, mosses, ferns, and algae can be the target. Among them, it is preferable to target plants having chlorophyll, and it is more preferable to target trees and grasses having flat leaves.

Examples of trees may include deciduous or evergreen conifers and broad-leaved trees. In the present invention, it is preferable to target conifers and broad-leaved trees having a low ratio of branches to leaves.

Examples of grasses include wild plants, crops (including those whose fruits are edible, such as strawberries and watermelons), and horticultural plants (including those whose flowers are grown for decorative purposes). In particular, it is preferable to target vegetables grown in open fields, vegetables and horticultural plants grown in greenhouses, and vegetables and horticultural plants grown under artificial light in vegetable factories.

Only one plant strain or a plurality of plant strains may be targeted. In a case in which a plurality of plant strains are targeted, the plants may be of one type or of two or more types. In a case in which only one plant strain is targeted, it is preferable to target a cluster of leaves thereof. In a case in which a plurality of plant strains are targeted, it is preferable to target a cluster of leaves or a plant community thereof.

Only one section of a plant may be a measuring section. In particular, in the case of targeting large plants such as trees, forests, or the like, or targeting a plurality of plant strains of small plants, it is preferable to use only one section of a plant as a measuring section.

The vegetation of a plant may be a measurement target as it is, or a section obtained from a plant may be a measurement target. In the present invention, it is preferable to use the vegetation of a plant, as it is, as a measurement target. That is, a preferred aspect of the plant sensor device of the present invention allows for non-destructive testing. This is preferable to destructive testing, such as conventional mowing methods (where all the leaves on a plant are removed and the total number of leaves is used to determine the leaf area index). When used as an optical sensor in the food industry, commercially available leafy vegetables may be used as the measurement target.

<Light Source>

The first aspect of the plant sensor device of the present invention comprises a light source that intermittently irradiates a plant with near-infrared light. Meanwhile, the second aspect of the plant sensor device of the present invention may not intermittently irradiate as long as it comprises a light source that irradiates a plant with near-infrared light.

The light source may comprise at least one near-infrared light source. The light source may use a plurality of near-infrared light source or may comprise a near-infrared light source and a light source with a wavelength other than that of near-infrared. From the viewpoint of reducing costs, it is preferable that the light source comprises a near-infrared light source alone.

It is preferable for the near-infrared light source to irradiate near-infrared light having a peak wavelength of 750 nm to 1100 nm from the viewpoint of easily suppressing the influence of external light from the surrounding environment. In order to suppress the influence on the photoreceptors of plants and the influence due to differences in water content in leaves, it is more preferable to irradiate with near-infrared light having a peak wavelength of 800 to 900 nm. Note that wavelength components shorter than 750 nm should not be included.

The type of near-infrared light source is not particularly limited, but examples include LEDs and lasers, with LEDs being preferred.

A specific preferred near-infrared light source is an LED having a peak wavelength of about 850 nm. For example, an LED commercially available for use in security cameras may be repurposed as a near-infrared light source for the plant sensor device. FIG. 4 shows the spectra of solar radiation and an LED light source (peak wavelength: 850 nm). As shown in FIG. 4, the spectrum of near-infrared light irradiated from an LED light source having a peak wavelength of 850 nm corresponds to the wavelength band where the solar radiation spectrum (solar radiation in FIG. 4) steadily decreases slightly. Therefore, an LED having a peak wavelength of about 850 nm is less susceptible to external light noise from solar radiation. The spectrum of the solar radiation plus this LED light source (solar radiation+LED in FIG. 4) closely reflects the spectrum of this LED light source. Therefore, by subtracting the output value of solar radiation only (which serves as the baseline) from the output value of solar radiation+LED from the radiation sensor, it is easy to stably and accurately determine the difference A calculated from (NIR output value)−(non-irradiation output value).

Meanwhile, near-infrared light having a peak wavelength of 750 nm to 1100 nm is preferred because it is less affected by absorption by pigments contained in plants (such as chlorophyll and carotenoids). Further, near-infrared light of 800 nm or more is more preferable since it is less affected by absorption by the photoreceptor (phytochrome) of a plant. Chlorophyll has two absorption bands and mainly absorbs blue light (400 nm to 500 nm) and red light (600 nm to 700 nm). There are two types of phytochromes: Pr which has an absorption wavelength center at 660 nm; and Pfr which has an absorption wavelength center at 730 nm. Both types convert light and affect plant growth.

Near-infrared light having a peak wavelength of 750 nm to 1100 nm is also preferable from the viewpoint that the influence of external light noise from artificial light sources is small.

<Radiation Sensor>

The plant sensor device of the present invention has a radiation sensor that is disposed on a side opposite the light source with respect to the plant, receives transmitted light of the near-infrared light that has passed through the plant, and outputs a photoelectrically converted output value.

There are no limitations on the shape of the radiation sensor as long as it can receive light that has passed through the plant. For example, it may be cylindrical such that light can be transmitted from all directions, or it may be semi-spherical or rod-shaped. Since the present invention utilizes transmitted light rather than reflected light, it is possible to reflect the characteristics of a particular part of vegetation, including the average effects of light scattering, reflection, and the like within the vegetation. In addition, by enlarging the area of the light source and the radiation sensor, the measurement range can be expanded to reflect the characteristics of the entire vegetation.

The radiation sensor is preferably connected via any output cable or wirelessly to the recording unit or the computer storing the recording unit. The output value can be output as photon flux density ($\mu mol \cdot m^{-2} s^{-1}$) or radiant intensity ($W \cdot m^{-2}$), but since it is ultimately a transmittance (ratio), there are no limitations on the units used. Here, the radiant intensity corresponds to a value obtained by converting the amount of photons per unit area (photon flux density) into energy (radiant intensity). Therefore, the output voltage (mV), which indicates the change in the amount of charge photoelectrically exchanged in the radiation sensor, can be converted into either the unit of photon flux density ($\mu mol \; m^{-2} s^{-1}$) or radiant intensity ($W \cdot m^{-2}$) and output. By multiplying the photoelectrically converted voltage (mV) by a conversion factor (gain adjustment), it can be easily converted into either the unit of radiant intensity or photon flux density. When one of the units is adopted as the standard, the output can be easily changed from one to the other by changing the settings: Radiant intensity ($W \cdot m^{-2}$) =photon flux density ($\mu mol \cdot m^{-2} s^{-1}$)×Avogadro's number ($mol^{-1}$)×Planck's constant (Js)×speed of light ($ms^{-1}$)/wavelength (m).

As the radiation sensor, a commercially available Si photodiode or solar radiation sensor can be used. A Si photodiode is a quantum-type photodetector and typically has high linear sensitivity in a range of 400 nm to 900 nm. By using a photodiode as the light-receiving surface (light-receiving unit) of the radiation sensor in this manner, it is possible to reduce the size and cost of the radiation sensor.

In the case of targeting grass, the distance from the light source to the light-receiving surface of the radiation sensor can be, for example, 1 cm or more, and is preferably 10 to 100 cm. Meanwhile, in the case of targeting trees or forests, the distance may be more than 100 cm. Although there is no particular upper limit, it can be, for example, 50 m, and is preferably 10 m (1000 cm) or less.

(Bandpass Filter)

It is preferable for the radiation sensor to comprise a bandpass filter that filters light having a wavelength band of less than 750 nm. It is also preferable for the radiation sensor to extract radiation of only near-infrared light having a wavelength band of 750 nm or more. By using a radiation sensor that can filter a wavelength band shorter than the target near-infrared light band, resistance to external light noise can be improved. In the case of using an LED having a peak wavelength of 850 nm as the light source, the bandpass filter more preferably filters light having a wavelength band of less than 800 nm, and particularly preferably filters light having a wavelength band of less than 800 nm and light having a wavelength band of 1100 nm or more.

In addition to the bandpass filter and the light-receiving surface (light-receiving unit), the radiation sensor may employ known configurations such as a substrate for adjusting the gain of the photoelectrically converted voltage (detection signal) and outputting it and a light diffusion plate.

<Light Source-Fixing Part, Radiation Sensor-Fixing Part, Connecting Member>

Preferably, the plant sensor device of the present invention comprises a light source-fixing part for fixing a light source.

In addition, preferably, the plant sensor device of the present invention comprises a radiation sensor-fixing part for fixing a radiation sensor.

In an example of the preferred aspect of the present invention, it is preferable for the light source-fixing part to fix the light source above a measuring section of a plant. In this case, it is preferable for the radiation sensor-fixing part to fix the radiation sensor below the measuring section of the plant in such a manner that the light-receiving surface faces the measuring section.

Meanwhile, in a case in which a large plant sensor device is used, a power supply, a reflector, and an optical system are required; thus, it is assumed that the light source becomes larger than the radiation sensor. Therefore, from the viewpoint of the physical stability of the device, it is preferable to flip their positions upside down such that the light source-fixing part fixes the light source below the measuring section of the plant and the radiation sensor-fixing part fixes the radiation sensor above the measuring section of the plant with the light receiving surface facing the measuring section.

The plant sensor device of the present invention can suppress the influence of external light. Therefore, it is possible to arrange a light source and a radiation sensor vertically relative to a plant or in vertical use, and it is also possible to arrange a light source and a radiation sensor horizontally or diagonally relative to a plant in horizontal and diagonal use. Particularly in the case of a handheld type, it is advantageous in that the plant sensor device can be used horizontally or diagonally.

Further, in a case in which the plant sensor device of the present invention comprises a radiation sensor-fixing part and a light source-fixing part, preferably, it also comprises a connecting member that connects the radiation sensor-fixing part and the light source-fixing part.

The connecting member is preferably extendable. Preferably, the distance from the light source to the light-receiving surface of the radiation sensor can be set at a desired distance.

In the present invention, the connecting member comprises a gripping part. There are no particular limitations on the gripping part, and it may be a fixed handle or a strap.

Recording Unit>

The plant sensor device of the present invention has a recording unit for recording output values from the radiation sensor. The recording unit is used as a so-called data logger.

Outputs from the radiation sensor are temporally input into the recording unit for recording and then input into the computing unit. Note that the recording unit may be integrated into a common member with the control unit or computing unit, for example, a CPU or a control panel.

In the first aspect of the present invention, the recording unit records the irradiation period and the extinction period of near-infrared light in the light source. In addition, the recording unit classifies output values from the radiation sensor into the following: (1) NIR output values during the irradiation period of near-infrared light; and (2) non-irradiated output values during the extinction period of near-infrared light. By classifying the output values into NIR output values and non-irradiated output values for recording in such a manner, the computing unit can calculate parameters relating to the leaf biomass of a plant using these values.

In the second aspect of the present invention, (1) NIR output values during the irradiation period of near-infrared light, included in the output values from the radiation sensor, are classified into the following: (1-1) first NIR output values during the irradiation period of near-infrared light at a first emission intensity; and (1-2) second NIR output values during the irradiation period of near-infrared light at a second emission intensity. By classifying the output values into first NIR output values and second NIR output values for recording in such a manner, the computing unit can calculate parameters relating to the leaf biomass of a plant using these values.

The recording unit can classify and record the output values during the irradiation period and the extinction period based on the time (timing) measured using a timing means such as a clock or timer (not shown in the drawings). In a case in which the control unit controls the irradiation period and the extinction period, the recording unit can classify and record the output values during the irradiation period and the extinction period based on the time synchronized with the control unit.

In the first aspect of the present invention, in a case in which the control unit described later controls near-infrared light to two levels of a first emission intensity and a second emission intensity as in the second aspect, it is more preferable for the recording unit to classify (1) NIR output values in the irradiation period of near-infrared light, included in the output values from the radiation sensor, into the following: (1-1) first NIR output values in the irradiation period of near-infrared light at a first emission intensity; and (1-1) second NIR output values in the irradiation period of near-infrared light at a second emission intensity. By classifying the output values into first NIR output values, second NIR output values, and non-irradiated output values for recording in such a manner, resistance to external light noise can be improved when the computing unit calculates parameters relating to the leaf biomass of a plant using these values.

In the present invention, it is preferable for the recording unit to store software, applications, programs, conversion formulas, conversion tables, and the like for calculating parameters relating to the growth degree of each type of plant.

<Computing Unit>

Preferably, the plant sensor device of the present invention comprises a computing unit for calculating a difference A from (NIR output value)−(non-irradiated output value) and further converting the difference A into a leaf area index.

The NIR output value is the output value (NIR) during the irradiation period of near-infrared light at a peak in a graph of the relationship between time from the start of measurement and the photon flux density (output value) as shown in FIG. 5. The non-irradiated output value is the output value (Non) during the irradiation period at a certain peak in FIG. 5. The difference A corresponds to the portion indicated as "A" in FIG. 5.

In the present invention, the leaf area index is preferably a linear function of a logarithmic function with the difference A or its function being an antilogarithm.

The computing unit can calculate the leaf area index from the difference A using a leaf area index conversion means. A program as an example of the leaf area index conversion means (program) is to calculate the LAI from a difference A based on the fact that the natural logarithm $Ln(A)$ of the difference A calculated from (NIR output value)−(non-irradiated output value) is proportional to the leaf area index LAI. As shown in FIG. 7, the relationship between the leaf area index LAI and the 850-nm transmittance (difference A) is expressed by an exponential function. According to the indoor results in FIG. 7, the 850-nm transmittance (difference A)=$90.645e^{-0.564 \times LAI}$, and by taking a natural logarithm of both sides, $Ln(A)$ can be calculated using the relational equation (1): $Ln(A)=Ln(90.645)-0.564 \times LAI$. In other words, the leaf area index LAI is expressed as a linear function of a logarithmic function with the difference A being an antilogarithm. By storing the relational equation (1) in the recording unit and performing the calculation, the leaf area index can be calculated from the difference A. From FIG. 7, it can be seen that $R^2$ of the relational expression (1) is 0.9915, and there is an extremely strong correlation between the LAI and the difference A calculated from (NIR output value)−(non-irradiation output value). Therefore, the results of calculation using this program can be used as an accurate leaf area index.

Alternatively, a calibration curve or conversion table may be prepared in advance, and the leaf area index may be calculated from the difference A. A calibration curve for each vegetation is stored in the recording unit, and a leaf area index corresponding to the calibration curve or the like can be output based on the difference A calculated from the calibration curve and the measured (NIR output value)−(non-irradiated output value).

Either in the first aspect or the second aspect of the present invention, in a case in which the control unit described later controls near-infrared light to two levels of a first emission intensity and a second emission intensity, it is preferable for the computing unit to calculate a difference B calculated from (first NIR output value)−(second NIR output value) and convert the difference B into a leaf area index. Resistance to external light noise can be improved by the following mechanism when calculating parameters relating to the leaf biomass of a plant using this value.

In the case of controlling the NIR output value at two levels, 100% and 50%, for recording, a calculation can be performed using the 50% output value as a baseline. That is, the computing unit calculates the difference B calculated from (100% NIR output value)−(50% NIR output value) and converts it into a leaf area index, thereby eliminating the influence of fluctuations in NIR transmission due to external light that may occur when the non-irradiated output value is used as the baseline.

The influence of fluctuations in NIR transmission due to external light can also be reduced by utilizing, as the NIR output value, the result of repeatedly measuring the near-infrared light of a light source by repeatedly turning the light source on and off in a short period of time.

It is preferable the output values in the middle period of 25% to 75% of the irradiation period and the extinction period are used as the NIR output value and the non-irradiation output value in the computing unit, when the irradiation period and the extinction period are set as 100% from the initial to the terminal of the irradiation period and the quenching period, respectively. Here, the graph in FIG. 5 will be used as an example. It is preferable to take the output values from the initial (ini; about 25 seconds after the start of measurement) to the terminal (ter: about 30 seconds after the start of measurement) of the irradiation period as 100% (corresponding to about 5 seconds) and use, as the NIR output values, the output values corresponding to 25% to 75% in the middle stage (ini: between 27.5 and 32.5 seconds from the start of measurement). The average value of the output values per hour during the middle stage may be used as the NIR output value, or the integrated value (or the average value) of the output values during the middle stage may be used as the NIR output value.

The initial of the irradiation period refers to the portion where the peak of the output value starts to rise in a graph of the relationship between the time from the start of measurement and the photon flux density (output value) as shown in FIG. 5. The terminal of the irradiation period refers to the portion where the output value reaches its minimum value after the peak output value gradually decreases.

<Control Unit>

Preferably, the plant sensor device of the present invention further comprises a control unit.

Preferably, the control unit performs control such that a cycle consisting of an irradiation period and an extinction period of a light source is repeated.

Only one of the irradiation and extinction periods of the light source may be prolonged in the control unit, but it is preferable to control the periods to be equal to each other. The control unit controls the irradiation and extinction periods of the light source to be approximately equal to each other within preferably ±30%, more preferably, ±20%, and particularly preferably ±10%. For example, in a case in which the irradiation period of the light source is set to 5 seconds, the extinction period is preferably 3.5 to 6.5 seconds, more preferably 4 to 6 seconds, and particularly preferably 4.5 to 5.5 seconds.

The control unit preferably controls the irradiation and extinction periods of the light source to be from 1 millisecond to 1 minute, more preferably from 10 milliseconds to 10 seconds, and particularly preferably from 0.1 seconds to 5 seconds.

In the first aspect of the present invention, it is preferable for the control unit to control the light source such that the light source irradiates infrared light at a first emission intensity and a second emission intensity that is 1/n (n is a positive integer) the first emission intensity. In addition, in the second aspect of the present invention, the control unit controls the light source such that the light source irradiates infrared light at a first emission intensity and a second emission intensity that is 1/n (n is a positive integer) the first emission intensity. The resistance to external light noise can be improved as the light source irradiates at two levels of the emission intensity during measurement. For example, given that the first emission intensity is 100% when n=2, the second emission intensity can be 1/n=0.5-fold, i.e., 50%. The 1/n is preferably 0.1 to 0.9, more preferably 0.3 to 0.7, and particularly preferably 0.4 to 0.6.

<Growing Means>

Preferably, the plant sensor device of the present invention comprises a growing means for controlling at least one of a fertilizer, a moisture, a temperature and a humidity, such that growth of plant leaves is suppressed when the leaf area index is above a predetermined range, or growth of plant leaves is promoted when the leaf area index is below a predetermined range.

It is preferable for the growing means to be controlled by the control unit.

There are no particular limitations on the growing means, and any means used in known vegetable factories or smart agriculture fields can be adopted. Preferably, near-infrared light is not included in the wavelength band of an artificial light source used for the growing means.

[Method for Active Optical Measurement of Plant]

The method for active optical measurement of a plant of the present invention is a method using the plant sensor device of the present invention. Unlike a method for passive optical measurement of a plant, the plant sensor device has the advantage that it can actively irradiate near-infrared light onto a plant, shorten the measurement period, and suppress the influence of external light from the surrounding environment.

The method for active optical measurement of a plant of the present invention is preferably used for ground truth for remote sensing from the air or space, plant growth measurement in a plant growth facility, forest vegetation measurement, and leaf biomass measurement for a plant community or cluster of leaves. In other words, these are preferable purposes of use of the plant sensor device of the present invention.

Other preferred aspects of the method for active optical measurement of a plant of the present invention are the same as preferred aspects of the plant sensor device of the present invention.

EXAMPLES

The present invention will be described in more detail below with reference to Examples and Comparative Examples. The materials, amounts used, ratios, processing contents, processing procedures, and the like shown in the following Examples can be changed appropriately without departing from the spirit of the present invention. Therefore, the scope of the present invention should not be construed as being limited by the specific examples shown below.

Example 1: Plant Sensor Device in First Aspect

The implementation of the plant sensor device of Example 1 was examined.

A demonstration experiment of the plant sensor device of Example 1 having the configuration shown in FIG. 1 was carried out by the following procedures, and it was demonstrated that the leaf area index LAI can be measured outdoors.

The light source used was a light source that was equipped solely with a near-infrared light source of an LED having a peak wavelength of 850 nm and a half width of 50 nm or less. The light source was placed above the cluster of leaves (vertically upward).

A Si photodiode was used as the radiation sensor (a commercially available solar radiation sensor). The radiation sensor was placed on the lower side (vertically lower side) of the cluster of leaves (plant), opposite to the light source.

The memory of a PC equipped with a general-purpose CPU was used as a recording unit, and output values obtained by photoelectric conversion of light received by the radiation sensor were recorded.

The CPU of the PC includes a computing unit and a control unit. The computing unit can use a leaf area index conversion means (program) stored in the memory to calculate a difference A calculated from (NIR output value)−(non-irradiated output value), and further convert the difference A into a leaf area index.

The control unit started NIR irradiation 5 seconds after the start of measurement and then turned off the NIR 5 seconds later, which was considered one cycle, and controlled the light source to repeat this cycle, thereby intermittently irradiating the cluster of leaves with near-infrared light.

In Example 1, the first cycle was without cluster of leaves (reference), the second cycle included a 5-second period of extinction and a 5-second period of NIR irradiation for the first cluster of leaves, and the third cycle included a 5-second period of extinction and a 5-second period of NIR irradiation for the second cluster of leaves. After the third cycle, an additional 5-second period of extinction was given.

The near-infrared light transmitted through the cluster of leaves was received by a radiation sensor, and the radiant intensity ($W \cdot m^{-2}$) was recorded in a recording unit as a photoelectrically converted output value. During the irradiation period and extinction period, the output values corresponding to 25% to 75% in the middle stage (mid) were used as the NIR output values and the non-irradiation output values, when the irradiation period and the extinction period are set as 100% from the initial (ini) to the terminal (ter) of each period.

Further, using a leaf area index conversion means (program) stored in the memory, the difference A calculated from (NIR output value)–(non-irradiated output value) was calculated, and the difference A was further converted into a leaf area index. FIG. 5 shows the obtained results. FIG. 5 is a graph showing the relationship between the time from the start of measurement and the photon flux density (output value) in Example 1. The leaf area index conversion means (program) is to calculate the LAI from a difference A based on the fact that the natural logarithm Ln(A) of the difference A calculated from (NIR output value)–(non-irradiated output value) is proportional to the leaf area index LAI.

From FIG. 5, it was found that the leaf area index of the first cluster of leaves was LAI=1, and the leaf area index of the second cluster of leaves was LAI=2. It was also found that the leaf area index can be calculated even when the measurement time is short, such as a few tens of seconds.

In addition, the non-irradiated output value is an output value measured based on external light such as sunlight. The plant sensor device of Example 1 calculates the leaf area index using the difference A calculated from (NIR output value)–(non-irradiation output value), i.e., the fluctuation in the output value due to irradiation with the NIR light source. Accordingly, the influence of external light from the surrounding environment can be virtually eliminated.

Therefore, it was found that the plant sensor device of the present invention can suppress the influence of external light from the surrounding environment and determine parameters relating to the leaf biomass of a plant with a simple and low-cost configuration (only one irradiation sensor) for quantifying the degree of plant growth.

Example 2: Plant Sensor Device in First Aspect

A demonstration experiment of the plant sensor device of Example 2 was carried out in the following manner, and the measurement results were compared between the indoors and the outdoors.

FIG. 6(A) is a photograph of a leaf of the plant that was a measurement target in Example 2, and the radiation sensor used. FIG. 6(B) is a photograph of the configuration of the plant sensor device of Example 2. In the plant sensor device of Example 2, the same light source and radiation sensor as those in Example 1 were used.

Indoors where sunlight does not enter, the number of leaves to be measured was increased, and the leaves were irradiated with near-infrared light from a light source in the same manner as in Example 1, thereby determining the leaf area index.

Meanwhile, outdoors in the sunlight, the number of leaves to be measured was increased, and the leaves were irradiated with near-infrared light from a light source in the same manner as in Example 1, thereby determining the leaf area index.

From the results of measurements indoors and outdoors, the 850 nm transmittance values when the leaf area index was 1, 2, 3 or 4 were determined and plotted on a graph. An approximation curve was created using an exponential function. The approximate curve was obtained by setting the leaf area index as x and the 850-nm transmittance (corresponding to difference A) as y (%), resulting in $y=90.645e^{-0.564x}$ and correlation coefficient $R^2=0.9915$ indoors and $y=90.557e^{-0.517x}$, and correlation coefficient $R^2=0.983$ outdoors. FIG. 7 shows the obtained results. FIG. 7 is a graph showing the relationship between leaf area index and 850-nm transmittance in indoor and outdoor measurements.

From FIG. 7, it can be seen that almost the same results were obtained from the indoor and outdoor measurements, and there was almost no influence from indoor lighting or sunlight. Therefore, it was found that the plant sensor device of the present invention can be used even in an artificial light environment or an environment where the solar radiation fluctuates.

In other words, it was found that the plant sensor device of the present invention can suppress the influence of external light from the surrounding environment and determine highly accurate parameters relating to the leaf biomass of a plant with a simple and low-cost configuration for quantifying the degree of plant growth.

Example 3: Plant Sensor Device in Second Aspect

A demonstration experiment of the plant sensor device of Example 3 was carried out in the following manner, and it was demonstrated that the leaf area index LAI can be measured outdoors when the light source is controlled to irradiate infrared light at a first emission intensity and a second emission intensity that is half the first emission intensity.

In Example 3, a leaf area index conversion means (program) stored in a memory as a computing unit was used to calculate the difference B calculated from (first NIR output value)–(second NIR output value). Further, a computing unit capable of converting the difference B into a leaf area index was used, and measurements were performed using the same plant sensor device as in Example 1, except that the control unit was controlled as follows.

The control unit started NIR irradiation at the first emission intensity (100%) 5 seconds after the start of measurement, NIR irradiation at the second emission intensity (50% of the first emission intensity) 3 seconds later, and then turned off the NIR for 4 seconds 3 seconds later, which was considered one cycle, and controlled the light source to repeat this cycle, thereby intermittently irradiating the cluster of leaves with near-infrared light.

In Example 3, the first cycle was without a cluster of leaves (reference). The second cycle included a 3-second NIR irradiation period at the first emission intensity, a 3-second NIR irradiation period at the second emission intensity, and a 4-second extinction period for a first cluster of leaves. The third cycle included a 3-second NIR irradiation period at the first emission intensity, a 3-second NIR irradiation period at the second emission intensity, and a 4-second extinction period.

The leaf area index conversion means (program) is to calculate the LAI from a difference B based on the fact that the natural logarithm Ln (B) of the difference B calculated from (first NIR output value)–(second NIR output value) is proportional to the leaf area index LAI.

From FIG. 8, it was found that the leaf area index of the first cluster of leaves was LAI=1, and the leaf area index of the second cluster of leaves was LAI=2. It was also found that the leaf area index can be calculated even when the measurement time is short, such as a few tens of seconds.

Further, the plant sensor device of Example 3 calculates the leaf area index using the difference B calculated from (first NIR output value)–(second NIR output value), i.e., the fluctuation in the output value due to irradiation with the NIR light source. Accordingly, the influence of external light from the surrounding environment can be virtually eliminated.

Therefore, it was found that the plant sensor device in the second aspect of the present invention can also suppress the influence of external light from the surrounding environment and determine parameters relating to the leaf biomass of a plant with a simple and low-cost configuration (only one irradiation sensor) for quantifying the degree of plant growth.

REFERENCE SIGNS LIST

1 Plant
2 Measuring section
11 Light source
12 Infrared light
13 Transmitted light
21 Radiation sensor
22 Light-receiving surface
23 Bandpass filter
30 Computer
31 Recording unit
32 Computing unit
33 Control unit
34 CPU
35 Display unit
36 Output unit
41 Light source-fixing part
42 Radiation sensor-fixing part
43 Connecting member
44 Gripping part
51 Growing means
100 Plant sensor device
L Distance from light source to light-receiving surface of radiation sensor
A Difference calculated from (NIR output value)–(non-irradiated output value)
NIR NIR output value
Non Non-irradiated output value
ini Initial
mid Middle stage
ter Terminal

The invention claimed is:

1. A plant sensor device, comprising: a light source that intermittently irradiates a plant with near-infrared light (NIR);
a radiation sensor that is disposed on a side opposite to the light source with respect to the plant, receives transmitted light of the near-infrared light that has passed through the plant, and outputs a photoelectrically converted output value; and
a recording unit that records the output value from the radiation sensor,
wherein the recording unit records an irradiation period and an extinction period of the near-infrared light in the light source, and
wherein the recording unit classifies output values from the radiation sensor into the following: (1) NIR output values during the irradiation period of the near-infrared light; and (2) non-irradiated output values during the extinction period of the near-infrared light.

2. The plant sensor device according to claim 1, which comprises a computing unit that calculates a difference A calculated from (NIR output value)–(non-irradiated output value) and further converts the difference A into a leaf area index.

3. The plant sensor device according to claim 2, wherein the leaf area index is a linear function of a logarithmic function with the difference A or the function being an antilogarithm.

4. The plant sensor device according to claim 3, which comprises a growing means for controlling at least one of a fertilizer, a moisture, a temperature and a humidity, such that growth of plant leaves is suppressed when the leaf area index is above a predetermined range, or growth of plant leaves is promoted when the leaf area index is below a predetermined range.

5. The plant sensor device according to claim 1, wherein the plant refers to a cluster of leaves or a plant canopy.

6. The plant sensor device according to claim 1, wherein the light source consists of a near-infrared light source.

7. The plant sensor device according to claim 6, wherein the near-infrared light source irradiates narrow-band near-infrared light having a peak wavelength of 750 nm to 1100 nm and a half width of 50 nm or less.

8. The plant sensor device according to claim 1, wherein the radiation sensor comprises a bandpass filter that filters light having a wavelength band of less than 750 nm so as to extract radiation of only near-infrared light having a wavelength band of 750 nm or more.

9. The plant sensor device according to claim 1, which comprises a radiation sensor-fixing part that fixes the radiation sensor,
wherein the radiation sensor-fixing part fixes the radiation sensor below a measuring section of the plant in such a manner that the light-receiving surface faces the measuring section.

10. The plant sensor device according to claim 1, which comprises a light source-fixing part that fixes the light source,
wherein the light source-fixing part fixes the light source above a measuring section of the plant.

11. The plant sensor device according to claim 1, which comprises: a radiation sensor-fixing part that fixes the radiation sensor; a light source-fixing part that fixes the light source; and a connecting member that connects the radiation sensor-fixing part and the light source-fixing part,
wherein a distance between the light source and a light-receiving surface of the radiation sensor is 1 to 1000 cm.

12. The plant sensor device according to claim 11, wherein the connecting member comprises a gripping part.

13. The plant sensor device according to claim 1, which comprises: a radiation sensor-fixing part that fixes the radiation sensor; and a light source-fixing part that fixes the light source,
wherein the light source-fixing part fixes the light source below a measuring section of the plant, and
wherein the radiation sensor-fixing part fixes the radiation sensor above the measuring section of the plant in such a manner that the light-receiving surface faces the measuring section.

14. The plant sensor device according to claim 1, wherein the output values in the middle period of 25% to 75% of the irradiation period and the extinction period are used as the NIR output value and the non-irradiation output value, when the irradiation period and the extinction period are set as 100% from the initial to the terminal of the irradiation period and the quenching period, respectively.

15. The plant sensor device according to claim 1, wherein the irradiation period and the extinction period are both between 1 millisecond and 1 minute.

16. The plant sensor device according to claim 1, which further comprises a control unit,
wherein the control unit controls the irradiation period and the extinction period of the light source to be approximately equal to each other within ±30%.

17. A method for active optical measurement of a plant using the plant sensor device according to claim 1.

18. The method for active optical measurement of a plant according to claim 17, which is used for ground truth for remote sensing from an air or space, plant growth measurement in a plant growth facility, forest vegetation measurement, and leaf biomass measurement for a plant community or cluster of leaves.

19. A plant sensor device, comprising: a light source that irradiates a plant with near-infrared light (NIR);
a radiation sensor that is disposed on a side opposite to the light source with respect to the plant, receives transmitted light of the near-infrared light that has passed through the plant, and outputs a photoelectrically converted output value;
a recording unit that records the output value from the radiation sensor; and
a control unit,
wherein the control unit controls the light source such that the light source irradiates infrared light at a first emission intensity and a second emission intensity that is 1/n (n is a positive integer) the first emission intensity, and
wherein the recording unit classifies (1) NIR output values during the irradiation period of near-infrared light, included in output values from the radiation sensor, into the following: (1-1) first NIR output values during the irradiation period of the near-infrared light at the first emission intensity; and (1-2) second NIR output values during the irradiation period of the near-infrared light at the second emission intensity.

20. The plant sensor device according to claim 19, which comprises a computing unit that calculates a difference B calculated from (first NIR output value)−(second NIR output value) and convert the difference B into a leaf area index.

* * * * *